United States Patent [19]
Jasinski

[11] 3,852,652
[45] Dec. 3, 1974

[54] RAPID BATTERY CHARGING SYSTEM AND METHOD

[75] Inventor: Leon Jasinski, Lauderhill, Fla.

[73] Assignee: Motorola, Inc., Chicago, Ill.

[22] Filed: Aug. 6, 1973

[21] Appl. No.: 385,937

[52] U.S. Cl. .............................................. 320/35
[51] Int. Cl. .......................................... H02j 7/06
[58] Field of Search ............ 320/30, 31, 35, 36, 39, 320/40

[56] References Cited
UNITED STATES PATENTS

| | | | |
|---|---|---|---|
| 2,585,005 | 2/1952 | Godshalk et al. | 320/36 X |
| 3,424,969 | 1/1969 | Barry | 320/30 X |
| 3,518,524 | 6/1970 | Rosyk | 320/36 X |
| 3,652,915 | 3/1972 | Eberts | 320/35 X |

Primary Examiner—J. D. Miller
Assistant Examiner—Robert J. Hickey
Attorney, Agent, or Firm—Eugene A. Parsons; Vincent Rauner

[57] ABSTRACT

A thermistor is internally mounted in a sealed nickel cadmium battery to be charged so as to sense the internal temperature of the battery and is electrically connected in a bridge to provide an electrical indication of the temperature of the battery. The electrical signal from the bridge is differentiated once to provide a signal representative of the rate of change of the temperature. A fast charging current is applied to the battery when the differentiated signal is below a predetermined amplitude and the temperature of the battery is within a predetermined range.

14 Claims, 2 Drawing Figures

RAPID BATTERY CHARGING SYSTEM AND METHOD

BACKGROUND OF THE INVENTION

1. Field of the Invention

With the advent of rechargeable sealed batteries and the multiplicity of uses therefor, apparatus and methods of rapidly recharging the batteries are in demand. In general, a rapid charge is considered any current equal to or in excess of the nominal one hour current rate of the cell. The nominal one hour rate of the cell is generally referred to as C, C being more specifically defined as the nominal rate of discharge current for one hour to a selected end voltage, such as 1 volt per cell. For example, a cell normally rated at 1.5 ampere hours has a C rate of 1.5 amps. Thus, any charging current applied to the cell which is in excess of 1.5 amps is considered a rapid charging current. In contrast to a rapid charging current, a trickle charge is generally in the neighborhood of 0.1 C current.

In sealed nickel cadmium batteries, charging currents are subject to an internal $I^2R$ loss which generates heat that increases linearly. However, near the end of the charging process oxygen is generated at the positive electrode. This oxygen is recombined at the negative electrode in an exothermic process which causes an additional rise in temperature. The temperature rise due to oxygen recombination adds to the heat caused by the normal $I^2R$ loss to produce a temperature which rises at a second order rate. If the charging process continues, more oxygen is produced, the internal pressure of the battery increases and the slope of the temperature curve increases until the battery is damaged.

The rate of the oxygen recombination within the battery is proportional to the internal temperature. When a battery is overcharged with constant current the oxygen produced is only partially recombined at the negative electrode and the pressure rises. However, the recombination increases the temperature which increases the absorption rate of the oxygen. When the absorption rate reaches the rate of oxygen generation the temperature and pressure of the battery stabilize. The point at which the temperature and pressure stabilize depends upon the rate of charge and the ambient temperature. For a trickle charge the temperature and pressure stabilize in a safe range for any allowable ambient temperatures.

DESCRIPTION OF THE PRIOR ART

There are a wide variety of charge control methods and apparatus that are designed to detect the end of the charging process by controlling one or more parameters. Examples of some of these are:
 absolute voltage control;
 rate of voltage rise control;
 oxygen detection inside a cell using a third electrode;
 cumulative net charge; and
 timed constant current after complete discharge.
As is apparent from the titles, all of these methods and apparatus do not provide the required reliability and each has some inherent problems.

Some prior art charge control methods directly measure the internal pressure or temperature of a cell and after the parameter measured reaches a predetermined level the rapid charging apparatus is disconnected from the cell. However, in some cases dangerous pressures are reached before the temperature exceeds the predetermined level. Thus, this method is not very reliable and the level at which the rapid charging ceases must be limited. To detect pressure each cell must include an internal pressure sensor, which significantly increases the cost and decreases the energy density of the battery.

SUMMARY OF THE INVENTION

The present invention pertains to a system and method for rapidly charging a battery including means for sensing the internal temperature of the battery and converting the temperature to an electrical signal, means for monitoring the electrical signal to provide a signal representative of the rate of change of the temperature, and charge control means for applying a rapid charging current to the battery when the absolute temperature of the battery is within a predetermined range and the monitored signal is below a predetermined rate of change.

It is an object of the present invention to provide an improved system and method for rapidly charging batteries.

It is a further object of the present invention to provide a system wherein an electrical signal representative of the internal temperature of the battery is monitored to provide a signal representative of the rate of change of the internal temperature of the battery, which monitored signal will provide a control signal for the rapid charging of the battery as long as the temperature is within a specific range.

It is a further object of the present invention to provide an improved system which can sense a predetermined slope in the temperature characteristic curve for the internal temperature of the battery and stop the rapid charging process at the occurrence of this slope.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
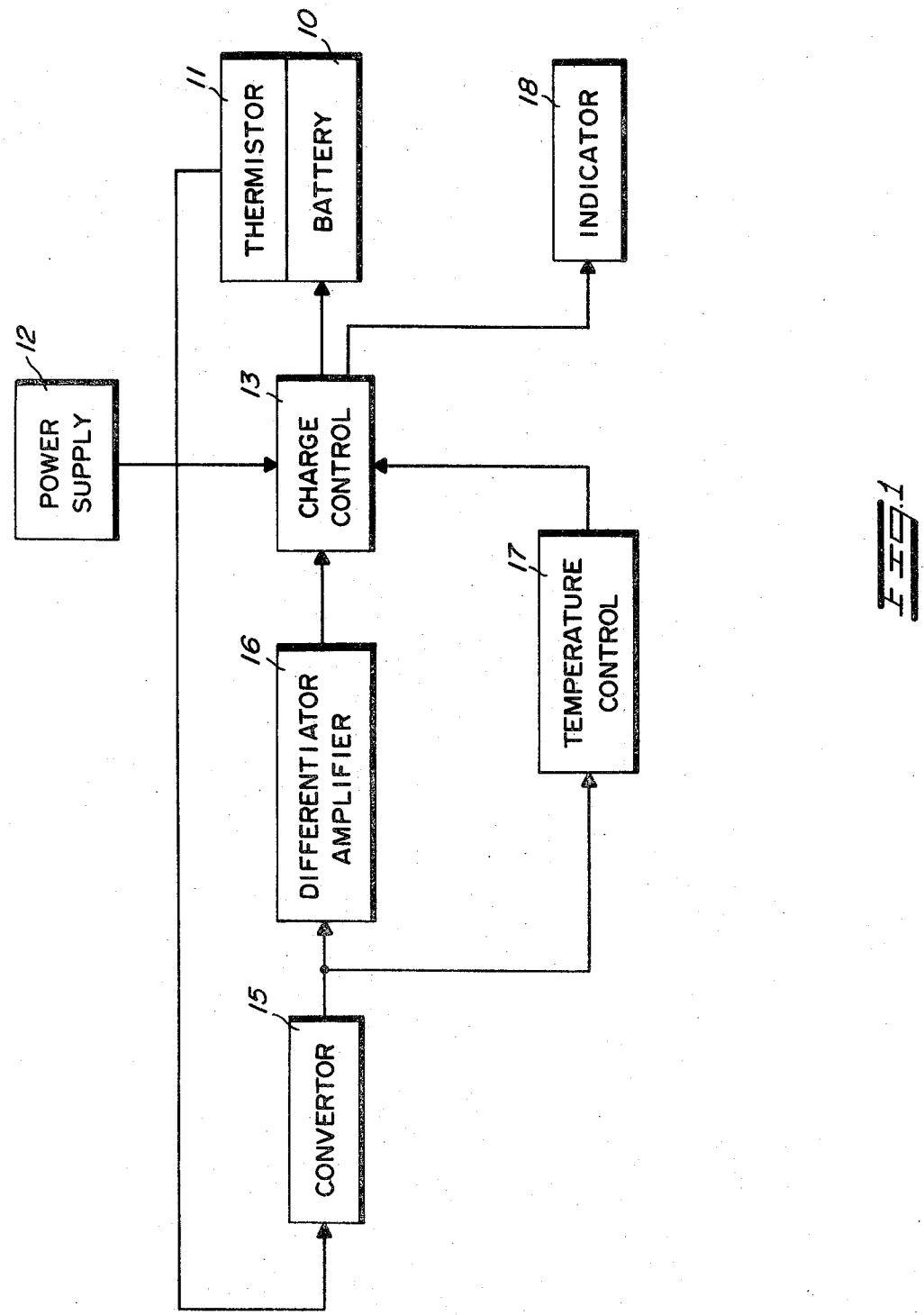
FIG. 1 is a block diagram of a rapid battery charger incorporating the present invention.

Referring to FIG. 1, a battery 10, which is to be charged by the disclosed system, has closely associated therewith temperature sensing means, which in this embodiment is a thermistor 11. At the present time many battery manufacturers are incorporating a thermistor in the construction of the battery so that the internal temperature of the battery can be closely monitored. The battery 10 is connected to receive a charging current from a power supply 12 by way of a charge control circuit 13. The thermistor 11 is connected to a converter 15 which provides an electrical signal representative of the temperature indicated by the thermistor 11. The electrical signal provided by the converter 15 is applied to a temperature control circuit 17 and to a monitoring means, which is any device for determining the slope or rate of change of the internal temperature of the battery, such as sampling, etc., and in this embodiment is a differentiator and amplifying circuit 16. Output signals from the differentiator and amplifying circuit 16 and temperature control circuit 17 are applied to the charge control circuit 13 to control the amount of current passing therethrough to the battery 10 from the power supply 12. An indicator 18 is connected to the charge control circuit 13 and indicates the mode of operation or amount of current flowing through the circuit 13. The differentiator and amplifying circuit 16 supplies a signal to the charge control circuit 13 which is representative of the rate of change of the temperature of the battery 10 and the temperature control circuit 17 permits the charge control circuit 13 to supply a rapid charge current to the battery 10 only when the temperature of the battery 10 is within a specified range. If the ambient temperature of the battery 10 is too high or too low the temperature control circuit 17 supplies a signal to the charge control circuit 13 allowing only a trickle charge current to be applied to the battery 10 until the temperature comes within the specified range.

Figure 2:
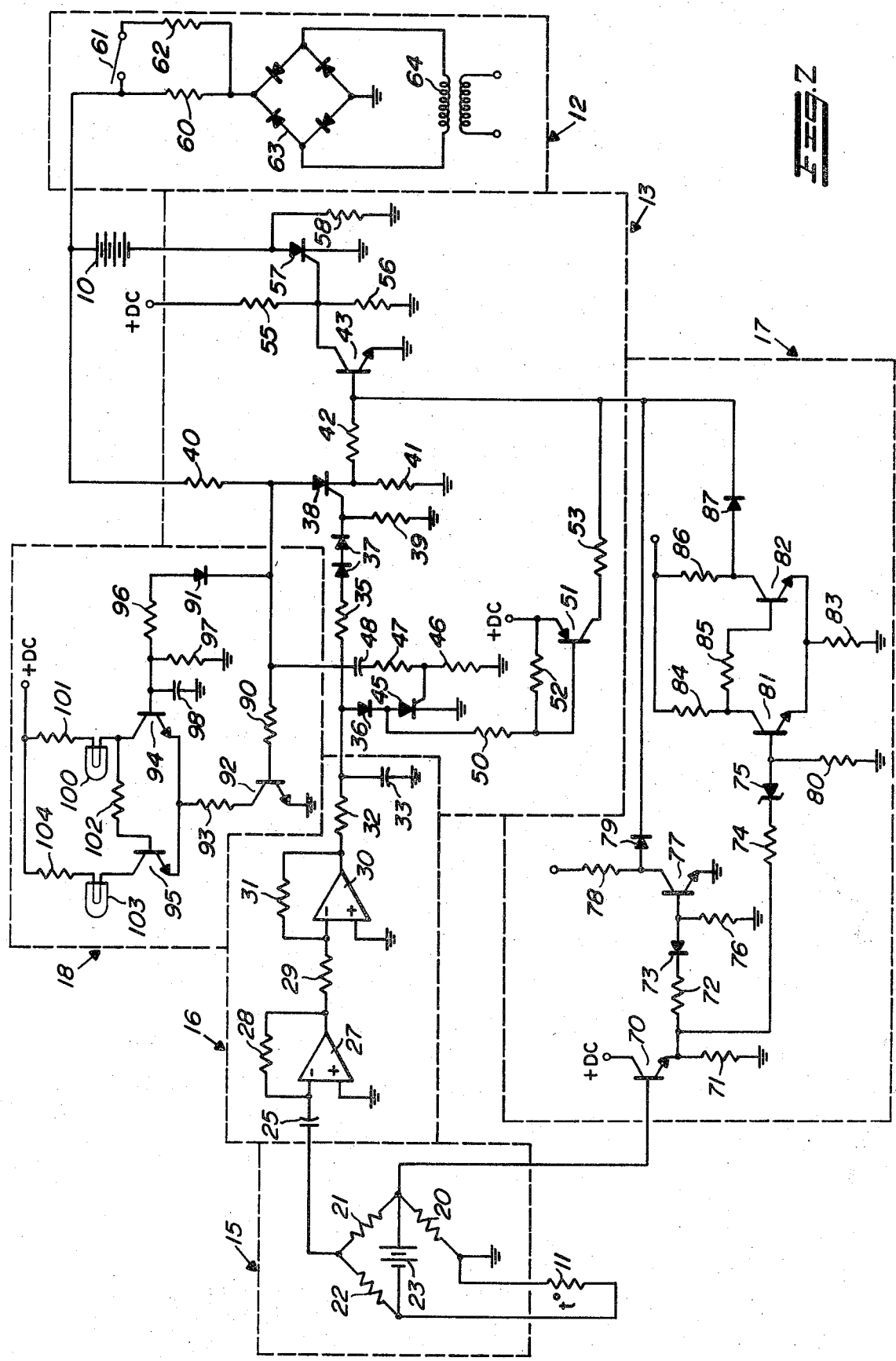
FIG. 2 is a schematic diagram of the system illustrated in block form in FIG. 1.

Referring to FIG. 2, a schematic diagram is illustrated with the various components separated by blocks generally as illustrated in FIG. 1. Thermistor 11, for indicating the internal temperature of the battery 10, is connected between two terminals of the converter 15, which in this embodiment is an electrical bridge circuit. The electrical bridge circuit is formed of three resistors 20, 21 and 22 connected in series between the terminals across which the thermistor 11 is connected. The junction of the thermistor 11 and the resistor 20 is grounded. The negative terminal of a DC supply 23, which may be a battery or the like, is connected to the junction of the thermistor 11 and the resistor 22 and the positive terminal is connected to the junction of the resistors 20 and 21. The junction of the resistors 21 and 22 is connected to a capacitor 25 in the differentiating and amplifying circuit 16 and supplies an electrical signal thereto representative of the temperature of the battery 10. The bridge circuit converts variations in the thermistor 11 due to temperature into electrical signals in a well known manner. It should be understood that other types of converters might be utilized by those skilled in the art but the bridge circuit is illustrated because of its simplicity and ease in understanding.

The capacitor 25 is a large capacitor connected in series between the junction of the bridge circuit and the negative input of an operational amplifier 27 and, in conjunction with the operational amplifier 27 operates as a differentiating circuit. In the present embodiment the capacitor 25 is approximately 50 microfarads so that it will differentiate the signal over a relatively long period of time. It should be understood that many other types of differentiating circuits might be utilized by those skilled in the art but the present circuit is illustrated because of its simplicity. The positive terminal of the operational amplifier 27 is grounded and a resistor 28 is connected between the output and the input thereof. The operational amplifier 27 has a high input impedance to provide the desired differentiating characteristics. The output of the operational amplifier 27 is connected through a resistor 29 to the negative input of a second operational amplifier 30. The positive terminal of the operational amplifier 30 is grounded and a resistor 31 is connected between the output terminal and the input terminal thereof. The output of the operational amplifier 30 is connected through a resistor 32 to one side of a capacitor 33, the other side of which is grounded. The capacitor 33 is a relatively large capacitor (in the present embodiment approximately 50 microfarads) and serves to eliminate any ripple that may be present on the signal at the output of the operational amplifier 30. The output signal of the differentiating and amplifying circuit 16 present on the junction of the resistor 32 and capacitor 33 is applied to the charge control circuit 13 at the junction of a resistor 35 and the anode of a diode 36. This output signal is representative of the rate of change of the internal temperature of the battery 10. It should be understood that the slope or rate of change of the internal temperature of the battery may be determined with other apparatus, such as by sampling the signal from the converter circuit 15 and holding and comparing the samples.

The resistor 35 of the charge control circuit 13 is connected to the anode of a pair of series connected diodes 37 the cathode of which is connected to the gate or control electrode of a silicon controlled rectifier (SCR) 38. The gate is also connected to ground through a resistor 39. The anode of the SCR 38 is connected through a resistor 40 to the positive terminal of the battery 10 and the cathode is connected through a resistor 41 to ground. The cathode of the SCR 38 is also connected through a resistor 42 to the base of a transistor 43, which serves as an OR gate.

The cathode of the diode 36 is connected to the anode of an SCR 45, the cathode of which is connected to ground. The gate or control electrode of the SCR 45 is connected to ground through a resistor 46 and to the junction of the resistor 40 and the anode of the SCR 38 through a series connected resistor 47 and capacitor 48. The anode of the SCR 45 is also connected through a resistor 50 to the base of a transistor 51. The emitter of the transistor 51 is connected to a terminal having a positive voltage source attached thereto and through a resistor 52 back to the base thereof. The collector of the transistor 51 is connected through resistor 53 to the base of the transistor 43. The emitter of the transistor 43 is grounded and the collector is connected to the junction of a first resistor 55, the other end of which is attached to a terminal having a source of positive DC voltage applied thereto, and a second resistor 56, the other end of which is grounded. The junction of the resistors 55 and 56 is also connected to the gate or control electrode of an SCR 57, the cathode of which is grounded and the anode of which is connected to the negative terminal of the battery 10. The SCR 57 forms a portion of a first charging circuit for rapidly charging the battery 10. The negative terminal of the battery 10 is also connected to ground through a resistor 58, which forms a portion of a second charging circuit for supplying a trickle charge to the battery 10.

The positive terminal of the battery 10 is connected to the power supply 12 at the junction of a resistor 60 and one terminal of a manual switch 61. The opposite terminal of the manual switch 61 is connected through a resistor 62 to the other side of the resistor 60 and serves to alter the amount of current supplied to the positive terminal of the battery 10. The junction of the resistors 60 and 62 is connected to an output terminal of a full wave rectifying bridge 63. The opposite terminal of the bridge 63 is grounded and an AC supply is connected thereacross by a transformer 64 in the usual fashion.

The base of a transistor 70 in the temperature control circuit 17 is connected to the junction of the resistors 20 and 21 in the converter 15, which junction varies in voltage amplitude as the thermistor 11 varies with temperature changes of the battery 10. The collector of the transistor 70 is connected to a terminal having a positive DC source applied thereto and the emitter is connected through a resistor 71 to ground. The emitter of the transistor 70 is also connected through a resistor 72 to the cathode of a zener diode 73 and through a resistor 74 to the cathode of a zener diode 75. The anode of the diode 73 is connected through a resistor 76 to ground and to the base of a transistor 77. The emitter of the transistor 77 is grounded and the collector is connected through a resistor 78 to a terminal having a positive source of DC connected thereto. The collector of the transistor 77 is also connected to the anode of a diode 79 the cathode of which is connected to the base of the transistor 43.

The anode of the diode 75 is connected through a resistor 80 to ground and to the base of a transistor 81. The emitter of the transistor 81 is connected to the emitter of a second transistor 82 and through a resistor 83 to ground. The collector of the transistor 81 is connected through a resistor 84 to a terminal having a positive source of DC connected thereto and through a resistor 85 to the base of the transistor 82. The collector of the transistor 82 is connected through a resistor 86 to the terminal having the positive source of DC voltage applied thereto and to the anode of a diode 87, the cathode of which is connected to the base of the transistor 43. The transistors 81 and 82 and their associated circuitry form a Schmitt trigger which is utilized in the present circuitry as a hysteresis containing circuit because a higher positive voltage is required at the base of the transistor 81 to cut off conduction in the transistor 82 than is required to cut off conduction in the transistor 81 and cause conduction in the transistor 82. In the present circuitry the zener diode 73 is approximately a 3 volt diode and the zener diode 75 is approximately an 8 volt diode, the purpose of which will become apparent presently.

The junction of the resistor 40 and the anode of the SCR 38 is connected to the indicator circuit 18 at the junction of a resistor 90 and the cathode of a zener diode 91. The opposite end of the resistor 90 is connected to the base of a transistor 92, the emitter of which is grounded and the collector of which is connected through a resistor 93 to the common connected emitters of a pair of transistors 94 and 95. The anode of the zener diode 91 is connected through a resistor 96 to the base of the transistor 94. The base of the transistor 94 is also connected to ground through a resistor 97 and through a capacitor 98. The collector of the transistor 94 is connected through a first lamp 100 and resistor 101, connected in series, to a terminal with a positive DC supply connected thereto. The collector of the transistor 94 is also connected through a resistor 102 to the base of the transistor 95, the collector of which is connected through a lamp 103 and series connected resistor 104 to the terminal having the positive DC supply thereon. The indicator lamps 100 and 103 may be a different color or may in some other way explain the different modes of the system which they are intended to indicate.

In the operation of the system, when the thermistor 11 is not connected into the leg of the bridge the voltage applied to the capacitor 25 is negative and approximately one-half of the voltage of the source 23. The operational amplifiers 27 and 30 cause inversions of the voltage which appears negative at the capacitor 33. This negative voltage back biases the diodes 36 and 37 so that the circuit does not operate. When the thermistor 11 is connected into the leg of the bridge circuit the voltage on the capacitor 25 rises to approximately 0 volts, assuming the thermistor 11 is at room temperature and balances the bridge, which provides an output from the operational amplifier 30 of approximately 12 volts. Assuming the battery 10 is connected into the circuit with the thermistor 11, a positive voltage is applied through the resistor 40 to the capacitor 48, triggering the SCR 45 into conduction and eventually charging the capacitor 48. The conduction of the SCR 45 drops the gate of the SCR 38 to approximately 1.4 volts, which is not sufficient to produce conduction therein, and lowers the potential on the base of the transistor 51 sufficiently to produce conduction therein. Conduction of the transistor 51 supplies a high positive potential to the base of the transistor 43 producing conduction therein and substantially shorting the gate of the SCR 57 to ground so that it cannot turn on. Since the SCR 57 cannot turn on the charging current for the battery 10 is limited to the trickle current flowing through the resistor 58. A few seconds after the thermistor 11 is connected into the circuit the capacitor 25 is discharged and the voltage at the output of the operational amplifier 30 drops to 0, which is not sufficient voltage to sustain conduction of the SCR 45. When the SCR 45 ceases conduction the transistor 51 no longer conducts and the drive to the transistor 43 is removed. When the transistor 43 ceases conduction the gate of the SCR 57 rises sufficiently, due to the voltage divider circuit formed by resistors 55 and 56, to cause conduction in the SCR 57 and provide a rapid charging current to the battery 10.

During the rapid charging of the battery 10, the internal temperature thereof rises steadily at a relatively constant rate. In the present embodiment the rapid charging current is in excess of 2 C and it has been found that under this rapid charging current the constant rise in the internal temperature of the battery, during the early charging stage, is approximately 0.4°C per minute. This constant rise in temperature produces a relatively constant voltage at the output of the operational amplifier 30. Near the end of the charging process the internal temperature of the battery 10 exhibits a sudden rise that produces a substantial rate of change voltage at the output of the operational amplifier 30. When this voltage reaches a predetermined level, corresponding to a predetermined rate of temperature change, the gate of the SCR 38 is sufficiently positive to produce conduction therein which supplies a positive voltage to the base of the transistor 43 causing conduction therein and shorting the gate of the SCR 57. Since the power supply 12 supplies a pulsating DC voltage to the series connected battery 10 and SCR 57, removing the voltage from the gate of the SCR 57 will cause the SCR to drop out of conduction between pulses. If the power supply 12 does not pulsate, but is a steady DC voltage, it will be necessary to limit the current through the SCR 57 to a value sufficiently low to cause the SCR 57 to drop out of conduction when the voltage is removed from the gate thereof.

A rapid charging current can be applied to the battery 10 as long as the temperature thereof lies within a predetermined range. For example, in the present embodiment the system is designed to allow rapid charging of the battery 10 between the temperatures of 5°C and 40°C. As the temperature of the battery ranges between 5°C and 40°C the voltage at the junction of the resistors 20 and 21 in the bridge circuit ranges between 4.5 and 10.5 volts, respectively. The three volt zener diode 73 connected in the base circuit of the transistor 77 determines the minimum voltage which must be applied to the base of the transistor 77 to cause conduction therein. In the present circuit 4.5 volts is required at the junction of the resistors 20 and 21 in the bridge circuit to produce conduction of the transistor 77. Thus, the transistor 77 is conducting whenever the voltage at the junction of the bridge circuit is above 4.5 volts. When the transistor 77 conducts the diode 79 is back biased and no voltage is supplied to the base of the transistor 43 to cause conduction thereof. Thus, whenever the voltage at the junction of the resistors 20 and 21 in the bridge circuit drops below 4.5 volts (the internal temperature of the battery 10 drops below 5°C) the transistor 77 cuts off and a positive voltage is supplied through the diode 79 to the base of the transistor 43 grounding the gate of the SCR 57 and reducing the charging current to the battery 10 to a trickle current.

Because of the 8 volt zener 75 in the base circuit of the transistor 81, the voltage at the junction of the resistors 20 and 21 in the bridge circuit must exceed 10.5 volts before the transistor 81 will conduct. Since the transistors 81 and 82 form a Schmitt trigger, the transistor 82 is conducting as long as the voltage at the junction of the bridge is below 10.5 volts. When the transistor 82 is conducting the diode 87 is back biased and no voltage is supplied to the base of the transistor 43. When the voltage at the junction of the bridge exceeds 10.5 volts the transistor 81 begins to conduct and the transistor 82 cuts off so that a positive voltage is supplied through the diode 87 to the base of the transistor 43, producing conduction thereof.

It should be noted that the Schmitt trigger has hysteresis in the operation thereof, that is, the voltage on the base of the transistor 81 must be somewhat higher to produce conduction of the transistor 81 than the voltage at which the transistor 81 drops out of conduction. For example, in the present circuitry the internal temperature of the battery 10 must be 40°C before the transistor 81 begins to conduct but, once the transistor 81 begins to conduct, the internal temperature of the battery 10 can drop to approximately 39.3 volts before the transistor 81 will cease conducting. Because of the hysteresis in the temperature control circuit 17 the rapid charging current will not be switched on and off at a rapid rate when a battery reaches 40°C, but will remain switched off until the battery cools sufficiently to allow a substantial charge to be applied thereto.

In the present circuit the lamp 100 of the indicating circuit 18 is red and the lamp 103 is green. When the differentiated signal from the operational amplifier 30 is sufficiently low so that the SCR 38 is not conducting, a positive voltage is applied to the base of the transistor 94 producing conduction therein and consequent energizing of the red lamp 100, indicating that the battery 10 has a rapid charge current applied thereto. When the differentiated signal from the operational amplifier 30 is sufficiently high to produce conduction of the SCR 38, the anode of the SCR 38 drops sharply cutting off the transistor 94 and causing conduction of the transistor 95. Conduction of the transistor 95 energizes the green lamp 103 which indicates that a trickle charge current is being applied to the battery 10.

Thus, a system for rapidly charging batteries is disclosed wherein the temperature of the battery is converted to an electrical signal which is differentiated to produce a signal representative of the rate of change of the temperature in the battery. This rate of change signal is utilized to control the charging of the battery as long as the temperature of the battery is within a predetermined range. Because the rate of change of the temperature is utilized rather than the absolute temperature, the absolute temperature of the battery does not affect the charging process, unless the temperature of the battery is outside of a predetermined range which would be detrimental to the battery.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A system for rapidly charging a battery comprising:
   a. temperature sensing means coupled to the battery for sensing changes of temperature within the battery;
   b. conversion means connected to said temperature sensing means for converting the temperature sensed by said sensing means to an electrical signal;
   c. a differentiating circuit connected to said conversion means for receiving the electrical signal therefrom and differentiating it once to provide a signal representative of the rate of change of the temperature;
   d. power supply means; and
   e. charge control means connected to said differentiating circuit and including first and second charging circuits connecting said power supply means to the battery for charging the battery at a first rate when the signal from the differentiating circuit is below a predetermined amplitude and at a second rate when the signal is above the predetermined amplitude.

2. A system as claimed in claim 1 wherein the temperature sensing means includes a thermistor located in the battery.

3. A system as claimed in claim 2 wherein the conversion means includes a bridge circuit with the thermistor connected in one leg thereof.

4. A system as claimed in claim 1 wherein the charge control means includes temperature control means connected to receive the electrical signal from the conversion means and provide a signal to activate the first charging circuit when the electrical signal lies within a predetermined range and a signal to activate the second charging circuit when the electrical signal exceeds the predetermined range.

5. A system as claimed in claim 4 wherein the second charging circuit includes a resistive element connected in series with the battery and the power supply means and the first charging circuit includes a silicon controlled rectifier having an anode and a cathode connected in parallel with said resistive element and a gate.

6. A system as claimed in claim 5 including in addition an OR type circuit having a plurality of inputs connecting the charge control means to the gate of the silicon controlled rectifier.

7. A system as claimed in claim 6 wherein the temperature control means includes first and second circuits connected between the conversion means and two inputs of the OR type circuit, a signal on any of the plurality of inputs to the OR type circuit activating the silicon controlled rectifier, said first circuit providing a signal when the electrical signal from the conversion means is below the lower value of the predetermined range, and said second circuit providing a signal when the electrical signal from the conversion means exceeds the upper value of the predetermined range.

8. A system as claimed in claim 7 wherein the second circuit includes a circuit having hysteresis therein.

9. A system as claimed in claim 7 wherein a third input of the OR type circuit is connected to receive the signal from the differentiating circuit.

10. A system as claimed in claim 1 including in addition indicating means connected to the charge control means for indicating when the first charging circuit and the second charging circuit are operating.

11. A system as claimed in claim 1 wherein the battery is a sealed nickel cadmium battery.

12. A system for rapidly charging a battery from a power supply and wherein the battery has an internally mounted thermistor for indicating the internal temperature of the battery, comprising;
   a. an electrical conversion circuit having terminals for connection to the thermistor of the battery, said circuit providing a first electrical signal representative of the temperature of the battery by converting the thermistor resistance variation into an electrical signal;
   b. an electrical monitoring circuit connected to said conversion circuit for receiving the first electrical signal therefrom and converting such signal to a second electrical signal representing the rate of change of the temperature of the battery; and
   c. charge control means connected to said monitoring circuit and including means for connecting the power supply means to the battery for charging the battery at a first rate when the second electrical signal from said monitoring circuit is below a predetermined level, and for charging the battery at a reduced rate when the said second electrical signal is above a predetermined level.

13. A method of rapidly charging a battery comprising the steps of:
   a. sensing the internal temperature of the battery and producing therefrom an electrical signal representative of the sensed temperature;
   b. differentiating the said electrical signal once and thereby creating a new electrical signal representing the rate of change of the previous signal; and
   c. applying a charging current of a first level to the battery as long as the new electrical signal remains below a predetermined value and reducing the charging current when the new electrical signal exceeds the predetermined value.

14. A method of rapidly charging a battery comprising the steps of:
   a. sensing the internal temperature of the battery and producing therefrom an electrical signal representative of the sensed temperature;
   b. monitoring the said electrical signal and converting this signal into a new electrical signal representative of the rate of change of the previous signal; and
   c. applying a charging current of a first level to the battery as long as the new electrical signal remains below a predetermined value and reducing the charging current when the new electrical signal exceeds the predetermined value.

* * * * *